(12) United States Patent
Kim et al.

(10) Patent No.: US 7,610,747 B2
(45) Date of Patent: Nov. 3, 2009

(54) SIDE THRUSTER MODULE

(75) Inventors: Won-Hoon Kim, Daejeon (KR); Won-Man Cho, Daejeon (KR); Bang-Eop Lee, Daejeon (KR); Soon-Il Moon, Daejeon (KR); Young-Il Son, Daejeon (KR)

(73) Assignee: Agency for Defense Development, Daejeon (KR)

( * ) Notice: Subject to any disclaimer, the term of this patent is extended or adjusted under 35 U.S.C. 154(b) by 451 days.

(21) Appl. No.: 11/503,707

(22) Filed: Aug. 14, 2006

(65) Prior Publication Data

US 2007/0193250 A1 Aug. 23, 2007

(30) Foreign Application Priority Data

Feb. 21, 2006 (KR) .................. 10-2006-0016958

(51) Int. Cl.
*F02K 1/00* (2006.01)
*F41G 7/00* (2006.01)

(52) U.S. Cl. ........................... 60/229; 244/3.22

(58) Field of Classification Search .............. 60/224, 60/230, 228, 771, 200.1, 229; 244/169, 3.22; 239/265.19, 265.23

See application file for complete search history.

(56) References Cited

U.S. PATENT DOCUMENTS

| 3,532,297 | A | * | 10/1970 | Maes | 244/169 |
| 4,967,982 | A | * | 11/1990 | Bagley | 244/3.22 |
| 5,433,399 | A | * | 7/1995 | Becker et al. | 244/3.22 |
| 5,570,573 | A | * | 11/1996 | Bonnelie | 60/253 |
| 6,315,238 | B1 | * | 11/2001 | Kirschner, Jr. | 244/3.22 |
| 6,651,438 | B2 | * | 11/2003 | McGrath et al. | 60/771 |
| 2003/0217547 | A1 | * | 11/2003 | Fujita | 60/229 |

FOREIGN PATENT DOCUMENTS

JP 2000-18898 A 1/2000

* cited by examiner

*Primary Examiner*—Michael Cuff
*Assistant Examiner*—Andrew Nguyen
(74) *Attorney, Agent, or Firm*—Scully, Scott, Murphy & Presser, P.C.

(57) ABSTRACT

A side thruster module, comprises: a cavity-type body skin extending in a longitudinal direction; a first thruster arranged in the body skin and extending in a longitudinal direction; and a conversion nozzle arranged in the body skin and extending in a radial direction perpendicular to the longitudinal direction, for converting a direction of a thrust generated from the first thruster in the longitudinal direction into the radial direction. A large number of thrusters can be mounted at the side thruster module thus to generate a high thrust, and the side thruster module can be slim in the radial direction perpendicular to the longitudinal direction.

19 Claims, 5 Drawing Sheets

SIDE THRUSTER MODULE

BACKGROUND OF THE INVENTION

1. Field of the Invention

The present invention relates to a side thruster module, and more particularly, to a side thruster module capable of having a slim size by decreasing an outer diameter thereof or an outer diameter of a flight object having the same by arranging a thruster thereof in parallel to a longitudinal direction thereof

2. Description of the Background Art

Generally, a side thruster module is mounted at a flight object thus to generate a thrust in a side direction and to control a attitude and a direction of the flight object. The thrust is generated by combusting a propellant or injecting high pressure gas.

When the flight object is extending in a longitudinal direction like a missile, a size of the flight object in a direction perpendicular to the longitudinal direction, that is, an outer diameter of the flight object is limited.

Accordingly, a side thruster module for stably controlling a attitude and a direction of the flight object by providing a sufficient thrust and for minimizing an outer diameter of the flight object, that is, a size in a radial direction is being required.

SUMMARY OF THE INVENTION

Therefore, an object of the present invention is to provide a side thruster module capable of having a slim size by minimizing a size of a flight object in a direction perpendicular to a longitudinal direction, and capable of generating a proper thrust.

To achieve these and other advantages and in accordance with the purpose of the present invention, as embodied and broadly described herein, there is provided a side thruster module, comprising: a body skin; a first thruster; and a conversion nozzle.

The side thruster module is jointed to a flight object, such as a missile or a satellite thus to generate a thrust in a side direction of the flight object at an initial or final flight stage of the flight object or at a high altitude, thereby controlling a attitude or a direction of the flight object.

The body skin is extending in a longitudinal direction, and is implemented as a cavity type. Both ends or one end of the body skin are jointed to the flight object.

The first thruster is an impulse-motor type thruster, and generates a thrust by combusting a solid propellant inside a combustion tube extending in a longitudinal direction. The first thrust is not arranged to be directly towards a radial direction of the body skin, but is arranged to be extending in a longitudinal direction of the body skin (a direction perpendicular to the radial direction of the body skin).

The conversion nozzle is jointed to an outlet of the first thruster, thereby changing a direction of a thrust generated from the first thruster into the radial direction. Accordingly, even if the first thruster is arranged in the longitudinal direction of the body skin, a thrust can be generated towards the radial direction of the body skin by the conversion nozzle. As the first thruster is arranged in the longitudinal direction of the body skin, a space inside the body skin occupied by the first thruster in the radial direction is decreased, and thus an outer diameter of the side thruster module is decreased. Accordingly, a flight object having the side thruster module such as a missile can be slim. Furthermore, a large number of first thrusters can be mounted at a flight object of the same outer diameter, thereby generating relatively stronger thrust.

The conversion nozzle can be integrally formed on an inner circumference of the body skin. The first thrusters are consecutively arranged on the inner circumference of the body skin in a circumferential direction in rows, thereby generating a thrust in every radial direction. A weight reduction hole is formed between the conversion nozzles consecutively formed in a circumferential direction of the body skin in rows, thereby reducing the weight of the body skin.

A jointing portion for jointing the first thruster to the conversion nozzle is formed between an outlet of the first thruster and an inlet of the conversion nozzle. The jointing portion is implemented as a male screw thread and a female screw thread, thereby easily jointing or detaching the first thruster to/from the conversion nozzle.

A conversion nozzle closure for sealing the conversion nozzle and the first thruster connected to the conversion nozzle and maintaining an initial pressure is jointed to the outlet of the conversion nozzle.

The side thruster module of the present invention can further comprise a second thruster.

The second thruster is also an impulse-motor type thruster. Differently from the first thruster, the second thruster is arranged to directly generate a thrust towards the radial direction of the body skin. An injection nozzle is jointed to the second thruster. The second thruster is provided with a jointing portion to be screw-jointed to a jointing groove formed at the body skin. An injection nozzle closure for sealing the second thruster and maintaining an initial pressure of the second thruster is jointed to the injection nozzle of the second thruster in a similar manner as the aforementioned conversion nozzle closure.

A cavity-type combustion tube constituting the first thruster and the second thruster is formed by winding a composite material on an outer circumferential surface thereof. Accordingly, the side thruster module can be stably operated even in a high pressure due to a propellant having a high burning rate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a side thruster module according to the present invention will be explained.

Figure 1:
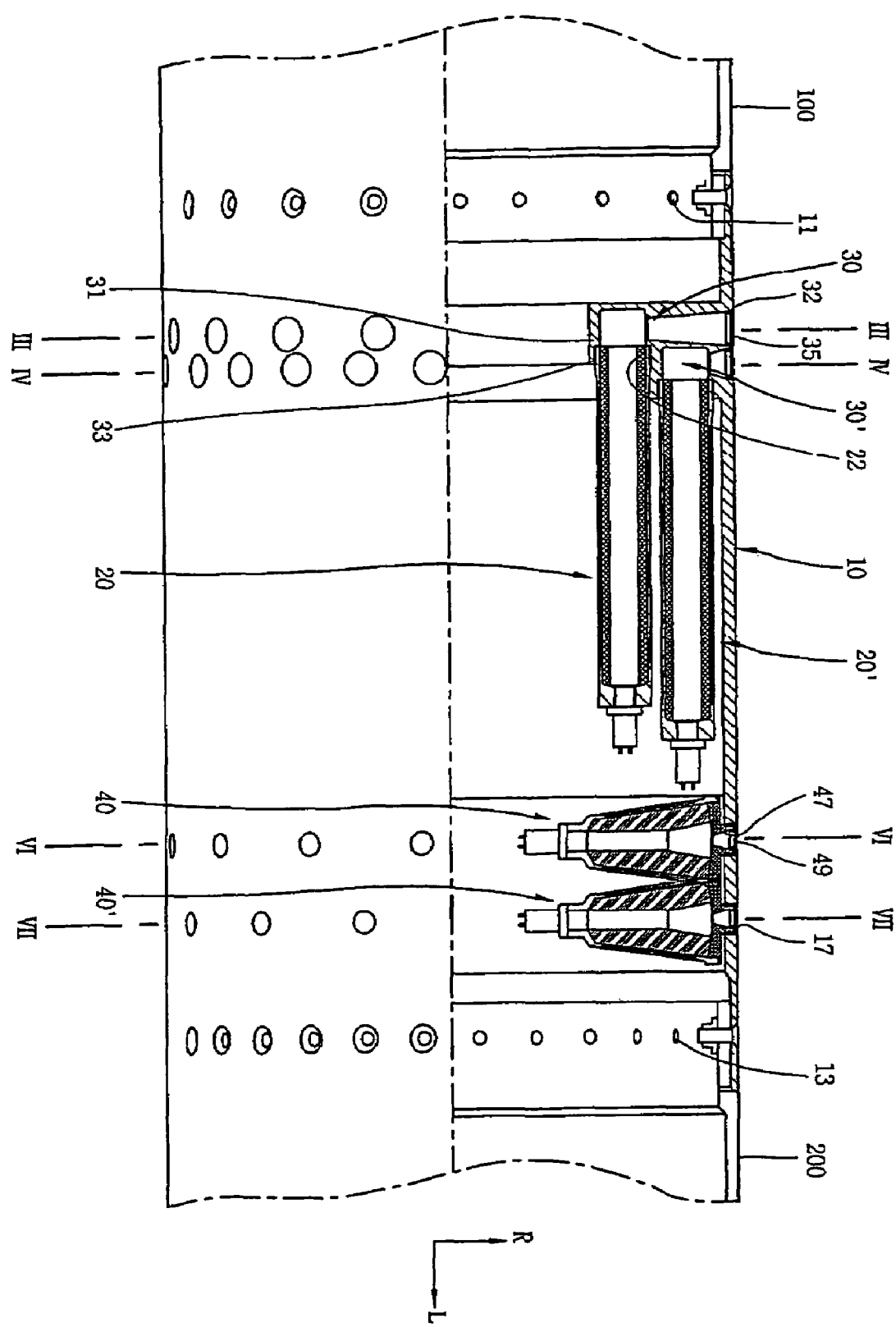
FIG. 1 is a sectional view showing a side thruster module according to a first embodiment of the present invention.

FIG. 1 is a sectional view showing a side thruster module according to a first embodiment of the present invention.

As shown, a side thruster module according to the present invention comprises a body skin 10, a first thruster 20, and a conversion nozzle 30.

The body skin 10 is a cavity-type member extending in a longitudinal direction (L). Jointing portions jointed to a front skin 100 and a rear skin 200, such as screw grooves 11 and 13 are formed at both ends of the body skin 10. The front skin 100 and the rear skin 200. The front skin 100 and the rear skin 200 constitute a body of a flight object such as a missile.

The first thruster 20 is extendingly formed in a longitudinal direction (L) of the body skin 10. The first thruster 20 is an impulse motor-type thruster for generating a thrust by combusting a propellant loaded therein. A thrust generated from the first thruster 20 is exhausted in a longitudinal direction of the first thruster 20. The first thruster 20 is an assembly arranged in a circumferential direction of the body skin 10 in plural, and the assembly more than two rows can be arranged in a radial direction (R). The reference numeral 20 denotes a first thruster of a first row, and the reference numeral 20' denotes a first thruster of a second row.

The conversion nozzle 30 is connected to the first thruster 20, and has an inlet 31 connected to an outlet 22 of the first thruster 20. The outlet 32 of the conversion nozzle 30 is arranged to generate a thrust towards the radial direction (R) of the body skin 10. Accordingly, a thrust generated from the first thruster 20 in the longitudinal direction (L) is converted into the radial direction (R) by the conversion nozzle 30. Preferably, the conversion nozzle 30 is integrally formed at an inner circumference of the body skin 10. The conversion nozzle 30 is arranged to have a plurality of rows in the longitudinal direction (L) of the body skin 10 in correspondence to the first thruster 20. The reference numeral 30 denotes a conversion nozzle of a first row, and the reference numeral 30' denotes a conversion nozzle of a second row.

Figure 2:
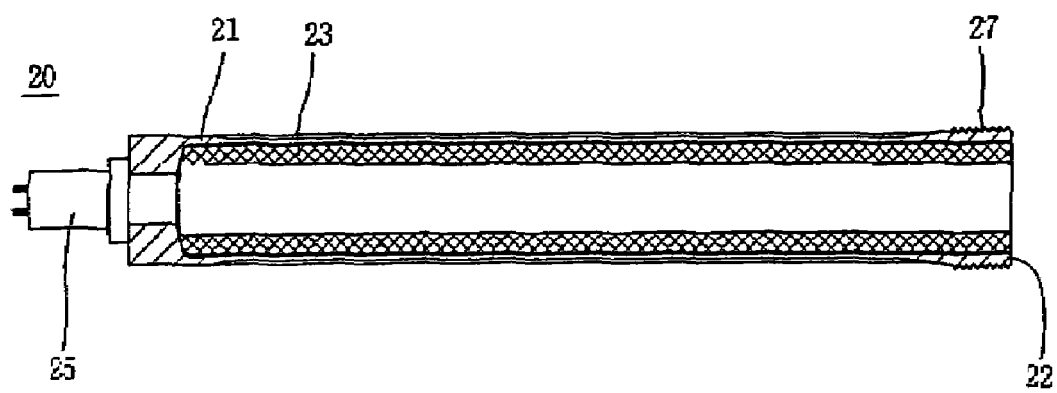
FIG. 2 is a sectional view of a first thruster of FIG. 1.

A female screw thread 33 is formed at an inner circumference of the inlet 31 of the conversion nozzle 30, and is screw-jointed to a male screw thread 27 of FIG. 2 of the outlet 22 of the first thruster 20. The first thruster 20 and the conversion nozzle 30 can be easily jointed to each other or be separated from each other by the male screw thread 27 and the male screw thread 33.

The side thruster module according to the present invention can further comprise a second thruster 40 arranged in the body skin 10 in the radial direction (R).

Differently from the first thruster 20 arranged in the longitudinal direction (L) and requiring the conversion nozzle 30 for converting a thrust direction to the radial direction (R), the second thruster 40 is arranged in the radial direction (R). Therefore, the second thruster 40 directly generates a thrust towards the radial direction (R). The second thruster 40 is an impulse motor-type thruster like the first thruster 20. The second thruster 40 is arranged in a circumferential direction of the body skin 10 in plural, and has a plurality of rows in the longitudinal direction (L). The reference numeral 40 denotes a second thruster of a first row, and the reference numeral 40' denotes a second thruster of a second row.

An injection nozzle 47 for the second thruster 40 is jointed to an outlet of the second thruster 40. A male screw thread 49 is formed at an outer circumference of the injection nozzle 47. The male screw thread 49 is screw-jointed to a female screw thread 18 of FIG. 8 formed at the body skin 10 that defines a jointing groove 17 for jointing the injection nozzle 47. The second thruster 40 can be easily jointed to or separated from the body skin 10 by screw-jointing the male screw thread 49 of the injection nozzle 47 to the female screw thread 18 of the body skin 10.

The first thruster 20 and the conversion nozzle 30 will be explained with reference to FIGS. 2 to 4.

FIG. 2 is a sectional view of a first thruster of FIG. 1.

As shown, the first thruster 20 comprises a combustion tube 21, a propellant 23, and an igniter 25.

The combustion tube 21 is formed as a cavity-type pipe for loading the propellant 23 therein. The combustion tube 21 is formed by filament-winding a composite material on an outer circumference of a high strength steel, titanium alloy, etc. in order to sustain a high combustion pressure (approximately 140 Mpa) when the propellant 23 is combusted and in order to have a light weight. As the composite material, a carbon fiber can be used.

The propellant 23 is arranged in the combustion tube 21, and is implemented as a solid propellant having a high burning rate so that the first thruster 20 can implement a fast response characteristic. The solid propellant 23 is attached to an inner wall of the combustion tube 21 by interposing a liner (not shown) therebetween.

The igniter 25 is jointed to one end of the combustion tube 21, and is ignited by an electric control signal thereby to combust the propellant 23.

As aforementioned, the outlet 22 of the combustion tube 21 through which a thrust generated when the propellant 23 is combusted is exhausted, is jointed to the inlet 31 of the conversion nozzle 30 of the body skin 10. For the jointing between the outlet 22 and the inlet 31, the male screw thread 27 is formed at an outer circumference of the outlet 22 of the combustion tube 21. The male screw thread 27 is screw-jointed to the female screw thread 33 formed at an inner circumference of the inlet 31 of the conversion nozzle 30.

The male screw thread 27 and the female screw thread 33 are formed at the outlet 22 of the combustion tube 21, and the inlet 31 of the conversion nozzle 30, respectively. However, it is also possible that the male screw thread 27 and the female screw thread 33 are formed at the inlet 31 of the conversion nozzle 30, and the outlet 22 of the combustion tube 21, respectively.

Figure 3:
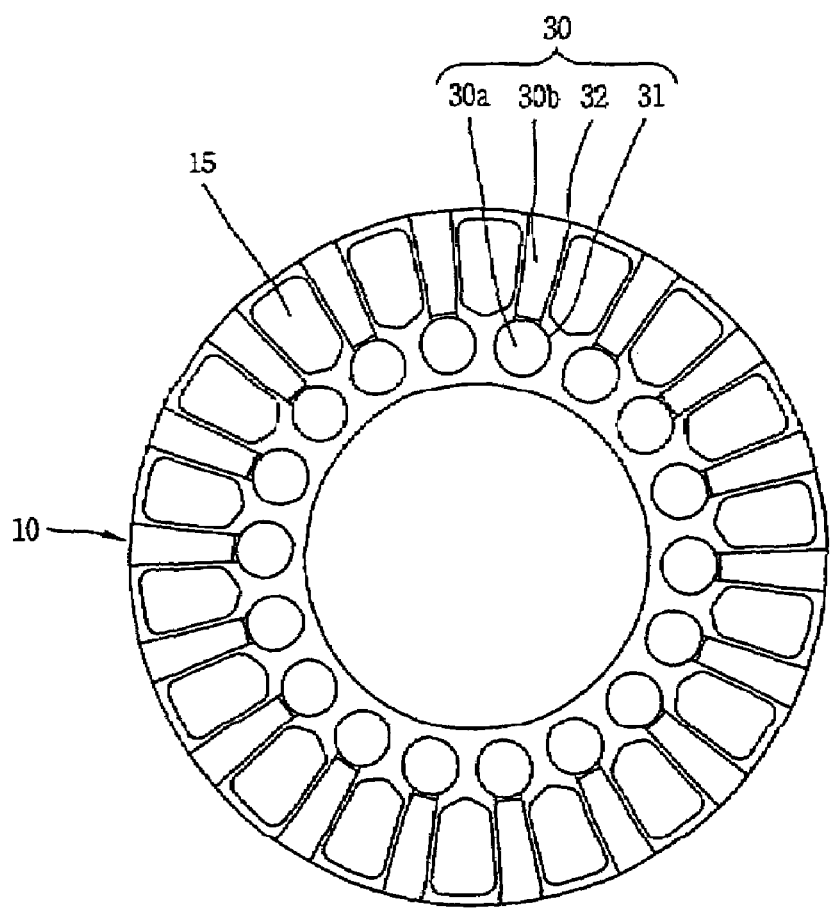
FIG. 3 is a sectional view of a body skin that forms a first-row conversion nozzle taken along line III-III of FIG. 1.
Figure 4:
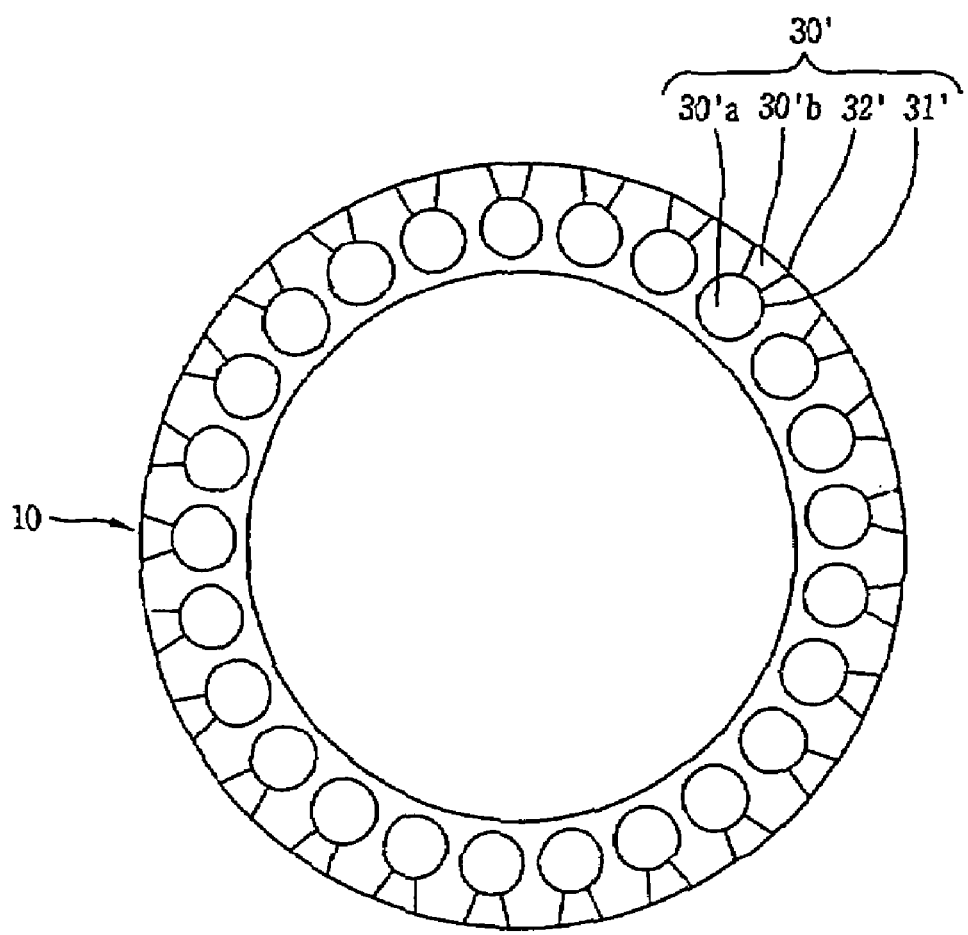
FIG. 4 is a sectional view of a body skin that forms a second-row conversion nozzle taken along line IV-IV of FIG. 1.

FIG. 3 is a sectional view of a body skin that forms a first-row conversion nozzle taken along line III-III of FIG. 1, and FIG. 4 is a sectional view of a body skin that forms a second-row conversion nozzle taken along line IV-IV of FIG. 1.

As shown, the conversion nozzles 30 and 30' are formed on an inner circumference of the body skin 10 in plurality. Accordingly, a thrust is generated in the radial direction (R) at each angle range along a circumferential direction of the body skin 10, thereby controlling a attitude and a direction of a flight object having the side thruster module of the present invention.

A length portion 30a opened in the longitudinal direction (L) of the first-row conversion nozzle 30 can have the same size as a length portion 30'a opened in the longitudinal direction (L) of the second-row conversion nozzle 30'. However, a radius portion 30b opened in the radial direction (R) of the first-row conversion nozzle 30 has a size larger than a radius portion 30'b opened in the radius direction (R) of the second-row conversion nozzle 30'. Accordingly, the first thruster 20 mounted at the first-row conversion nozzle 30 is arranged to be closer to a center axial line of the body skin 10 than the first thruster 20' mounted at the second-row conversion nozzle 30'. That is, the first thrusters 20 and 20' can be mounted at the body skin 10 in the radial direction (R) as a multi-stage. Accordingly, a large number of the first thrusters 20 are mounted at the inner space of the body skin 10, thereby generating a relatively stronger thrust (refer to FIG. 1).

A weight reduction hole 15 is formed between the adjacent first-row conversion nozzles 30. The weight reduction hole 15 is formed at a non-utilized space between the conversion nozzles 30, thereby reducing the weight of the body skin 10. Accordingly, an increased weight of the flight object due to mounting of the side thruster module can be decreased to some degree.

The first-row conversion nozzle 30 and the second-row conversion nozzle 30' are arranged in a zigzag form in the longitudinal direction (L), thereby minimizing a length increase of the body skin 10 in the longitudinal direction (L).

The second thruster 40 will be explained with reference to FIGS. 5 to 7.

Figure 5:
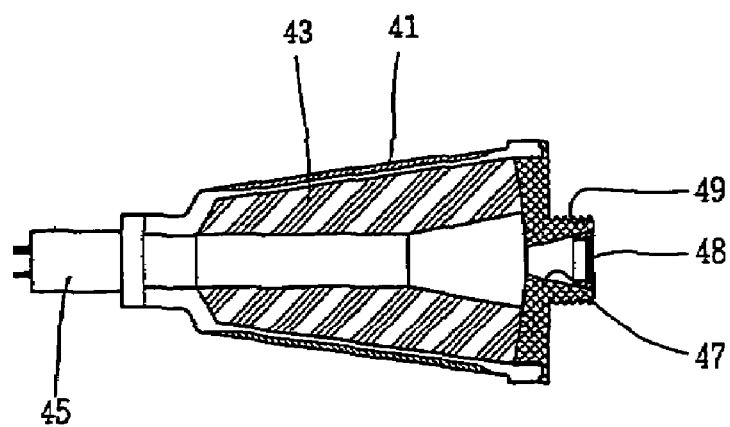
FIG. 5 is a sectional view of a second thruster of FIG. 1.

FIG. 5 is a sectional view of a second thruster of FIG. 1.

As shown, the second thruster 40 comprises a combustion tube 41, a propellant 43, an igniter 45, and an injection nozzle 47.

Differently from the first thruster 20, the second thruster 40 is arranged in the radial direction (R) of the body skin 10. Therefore, the second thruster 40 directly generates a thrust towards the radial direction (R). The combustion tube 41 of the second thruster 40 has a length shorter than that of the combustion tube 21 of the first thruster 20, but has a thickness thicker than that of the combustion tube 21 of the first thruster 20.

The injection nozzle 47 is jointed to an outlet of the second thruster 40 by a screw-jointing method, for example, so that a thrust can be directly generated in the longitudinal direction of the second thruster 40. An injection nozzle closure 48 is jointed to the outlet of the injection nozzle 47, thereby maintaining a pressure of the second thruster 40 at the time of an initial ignition and sealing the second thruster 40. The injection nozzle closure 48 is jointed to the injection nozzle 47 by an adhesive, a brazing, etc. The injection nozzle closure 48 can be formed of aluminum, plastic, cork, etc.

Figure 8:
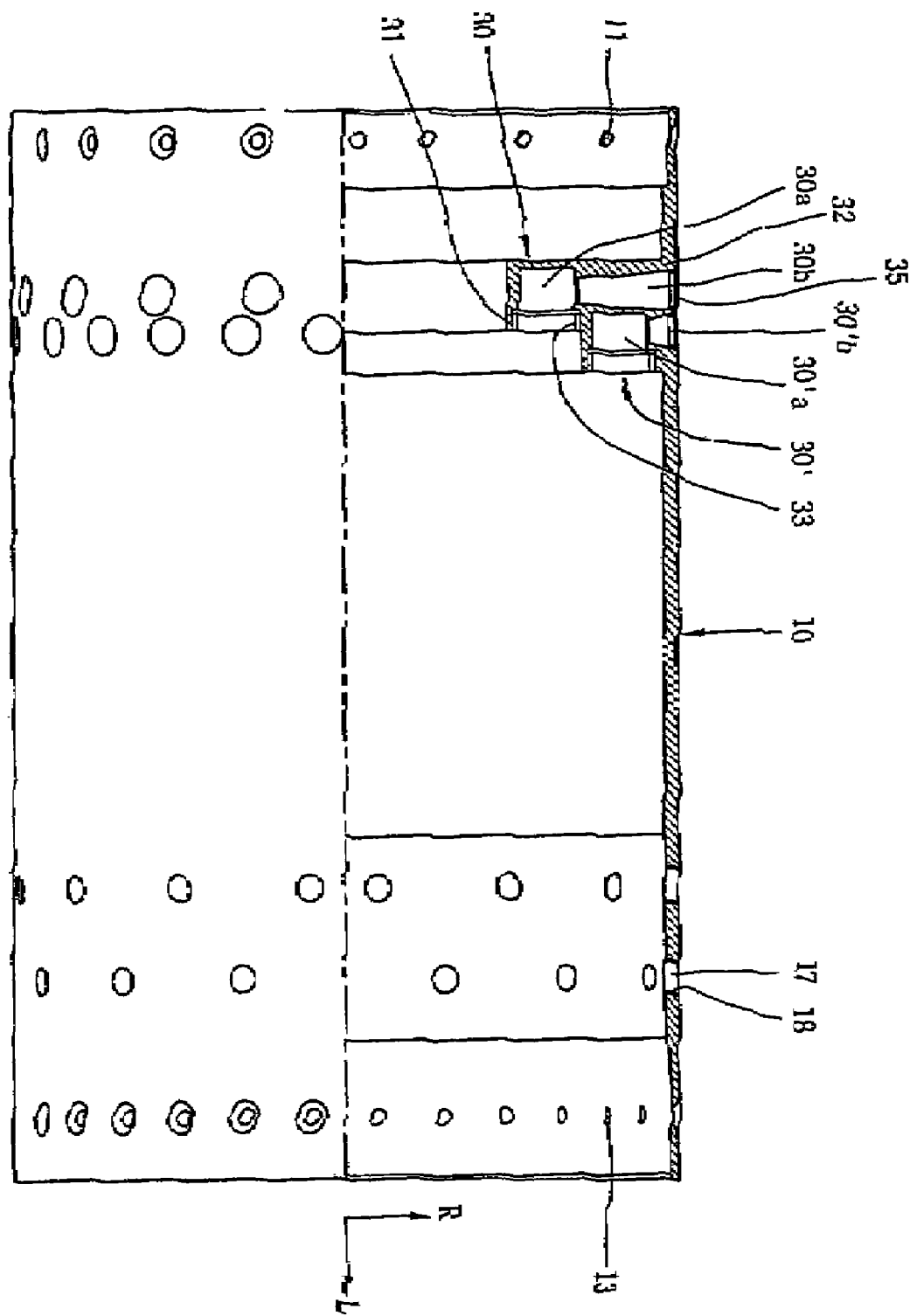
FIG. 8 is a view showing a body skin of FIG. 1.

A male screw thread 49 is formed at an outer circumference of the injection nozzle 47, and the injection nozzle 47 is screw-jointed to the female screw portion 18 formed at the body skin 10 that defines the jointing groove 17 (Refer to FIG. 8). It is also possible that the female screw thread is formed at an outer circumference of the injection nozzle 47, and the male screw thread is formed at the body skin 10 that defines the jointing groove 17.

The combustion tube 41 of the second thruster 40 can be formed in the same manner as the combustion tube 21 of the first thruster 20, and the propellant 43 of the second thruster 40 can be operated in the same manner as the propellant 23 of the first thruster 20, thereby omitting their minute explanation.

Figure 6:
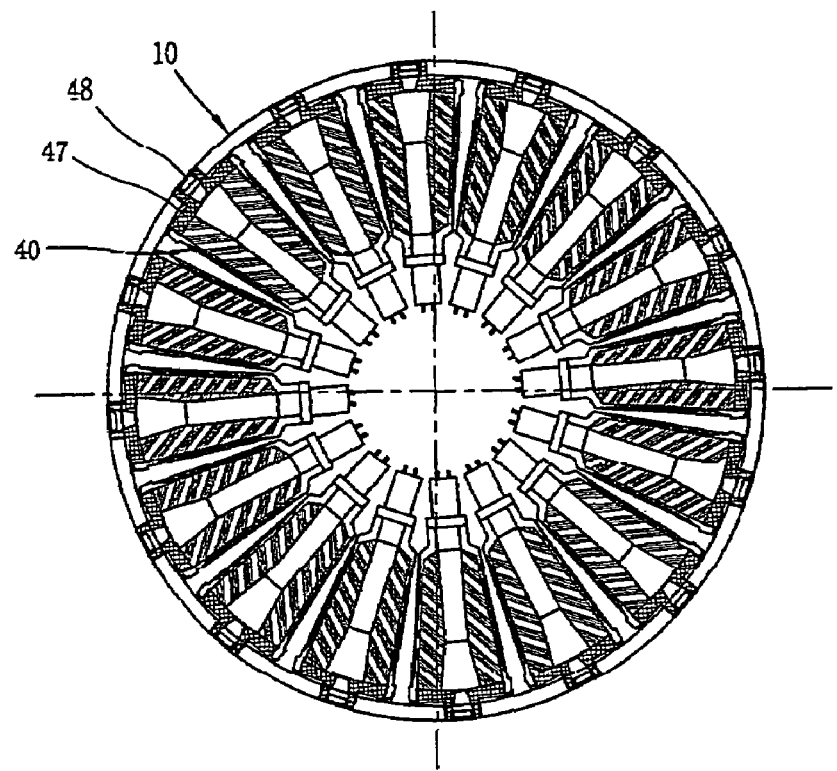
FIG. 6 is a sectional view showing a state that a first-row injection nozzle is jointed to a body skin, which is taken along line VI-VI of FIG. 1.
Figure 7:
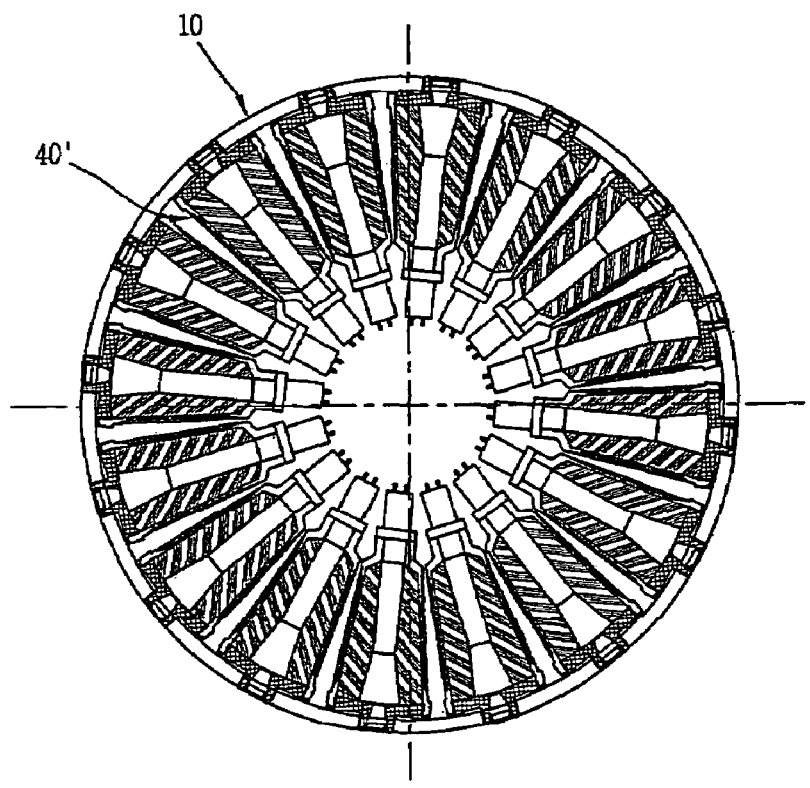
FIG. 7 is a sectional view showing a state that a second-row injection nozzle is jointed to a body skin, which is taken along line VII-VII of FIG. 1.

FIG. 6 is a sectional view showing a state that a first-row injection nozzle is jointed to a body skin, which is taken along line VI-VI of FIG. 1, and FIG. 7 is a sectional view showing a state that a second-row injection nozzle is jointed to a body skin, which is taken along line VII-VII of FIG. 1.

As shown, the first-row second thruster 40 and the second-row second thruster 40' adjacent to each other in the longitudinal direction (L) of the body skin 10 are arranged in a zigzag form not in a straight-line form along the circumferential direction of the body skin 10. Accordingly, a space inside the body skin 10 in the longitudinal direction (L) required to arrange the second thrusters 40 and 40' is minimized, thereby minimizing an entire size of the side thruster module of the present invention.

The body skin 10 will be explained with reference to FIG. 8.

FIG. 8 is a view showing a body skin of FIG. 1.

As shown, a screw groove 11 for connecting a front skin 100 to the body skin 10, and a screw groove 13 for connecting a rear skin 200 to the body skin 10 are formed at both ends of the body skin 10, respectively.

The conversion nozzles 30 and 30' jointed to the first thruster 20 and 20' for converting a thrust direction from the longitudinal direction (L) into the radial direction (R) are integrally formed at the inner circumference of the body skin 10.

More concretely, the conversion nozzle 30 includes a length portion 30a opened in the longitudinal direction (L) and connected to the first thruster 20; and a radius portion 30b opened in the radial direction (R) thus to be connected to the length portion 30a, and having an outlet 32 through which a thrust of the first thruster 20 is exhausted in the radial direction (R). A female screw thread 33 to be jointed to the first thruster 20 is formed at an inner circumference of the inlet 31 of the conversion nozzle 30.

The radius portion 30b of the first-row conversion nozzle 30 has a length longer than the radius portion 30'b of the second-row conversion nozzle 30', so that the first thruster 20 jointed to the first-row conversion nozzle 30 can be arranged to be closer to the center axial line of the body skin 10 than the first thruster 20' jointed to the second-row conversion nozzle 30'.

A conversion nozzle closure 35 is jointed to the body skin 10 that defines the outlet 32 of the conversion nozzle 30, thereby maintaining an initial pressure of the conversion nozzle 30 and sealing the first thruster 20 connected to the conversion nozzle 30. A jointing method or a fabrication method of the conversion nozzle closure 35 is the same as that of the injection nozzle closure 48, and thus its minute explanation will be omitted.

A jointing groove 17 for jointing the second thruster 40 is formed at the body skin 10. A female screw thread 18 is formed at the body skin 10 that defines the jointing groove 17. The female screw thread 18 is jointed to a male screw thread 49 formed at an outer circumference of a nozzle 47 of the second thruster 40, thereby jointing the second thruster 40 to the body skin 10 in the radial direction (R).

An assembly and an operation of the side thruster module according to the present invention will be explained.

As shown in FIG. 8, the body skin 10 having the conversion nozzle 30 for jointing the first thruster 20 and having the jointing groove 17 for jointing the second thruster 40 is prepared.

Then, the first thruster 20 is pushed into the body skin 10 in the longitudinal direction (L) through one opened end of the body skin 10, and the second thruster 40 is rotated to be jointed to the first thruster 20 so that the male screw thread 27 of the second thruster 40 can be screw-jointed to the female screw thread 33 of the inlet 31 of the conversion nozzle 30. Herein, the first thruster 20 of a first-row is stacked on the first thruster 20' of a second-row in the radial direction (R) (refer to FIG. 1).

Next, the second thruster 40 is pushed into the opened end of the body skin 10 with an arranged state in the radial direction (R). Then, the male screw thread 49 of the second thruster 40 is screw-jointed to the female screw thread 18 formed at the body skin 10 that defines the jointing groove 17.

The igniter 25 of the first thruster 20 and the igniter 45 of the second thruster 40 are electrically connected to a controller (not shown), thereby being ignited by the controller.

The side thruster module is respectively jointed to the front skin 100 and the rear skin 200 of a flight object through the screw grooves 11 and 13 formed at both ends thereof.

When a flight object is initially launched or in a final stage or in a high altitude where it is difficult to control its attitude and direction, the controller generates a signal for operating the first thruster 20 or the second thruster 40 positioned at a point requiring a thrust in the radial direction (R) of the body skin 10.

The igniters 25 and 45 of the first thruster 20 and the second thruster 40 are ignited by the signal, thereby combusting the propellant 23 of the first thruster 20 or the propellant 43 of the second thruster 40.

As a thrust is generated by the combustion of the propellants 23 and 43, the side thruster module (and a flight object having the side thruster module) receives a force in an opposite direction to the thrust generated direction. Accordingly, a attitude and a direction of the flight object can be freely controlled.

In the present invention, the first thruster 20, the conversion nozzle 30, and the second thruster 40 have two rows, respectively. However, they can be constructed to have three rows or more than three, or only one row.

In the side thruster module of the present invention, the first thruster is arranged in the longitudinal direction of the flight object, and the conversion nozzle is constructed to convert a thrust direction into the radial direction. Accordingly, an outer diameter of the side thruster module can be decreased, and thus an entire size of a flight object to which the side thruster module is mounted can be decreased.

Furthermore, since the conversion nozzles adjacent to each other in rows where the first thruster is installed have different radius lengths, the first thruster having a plurality of rows can be arranged in the radial direction as a stack type. Accordingly, a large number of first thrusters can be mounted at the side thruster module of a limited thickness, thereby generating a relatively stronger thrust.

Besides, since the weight reduction hole is formed between the adjacent conversion nozzles where the first thruster is installed, the weight of the body skin is reduced. The conversion nozzles adjacent to each other in rows are arranged in a zigzag form, thereby minimizing a space required in the longitudinal direction.

The conversion nozzle to which the first thruster is jointed is integrally formed at the body skin, thereby facilitating a fabrication and an assembly.

Furthermore, the second thruster is installed so as to directly generate a thrust towards the radial direction, and has a thickness thicker than that of the first thruster thereby to mount a relatively large number of propellants. Accordingly, the first thruster and the second thruster can be selectively or simultaneously operated according to a size of a thrust.

Besides, the conversion nozzle connected to the first thruster and the second thruster are easily sealed by the conversion nozzle closure and the injection nozzle closure, respectively, thereby easily maintaining a pressure of the thruster at the time of an initial ignition.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A side thruster module, comprising:
    a cavity-type body skin extending in a longitudinal direction;
    a plurality of first thrusters arranged in the body skin and extending in a longitudinal direction;
    a plurality of second thrusters arranged to be spaced from the plurality of first thrusters in the longitudinal direction of the body skin so as to be extending in a radial direction, for generating a thrust in the radial direction through a jointing groove of the body skin; and
    a plurality of conversion nozzles being arranged in the body skin and extending in a radial direction perpendicular to the longitudinal direction, for converting a direction of a thrust generated from the plurality of first thrusters in the longitudinal direction into the radial direction, wherein the conversion nozzles are arranged in a circumferential direction of the body skin, and in at least two rows spaced from each other in the longitudinal direction of the body skin.

2. The side thruster module of claim 1, wherein each of the first thrusters comprises:
    a cavity-type combustion tube;
    a propellant arranged in the combustion tube for generating a thrust at the time of combustion; and
    an igniter jointed to the combustion tube for igniting the propellant.

3. The side thruster module of claim 2, wherein the combustion tube is formed by filament-winding a composite material on an outer circumference of a cavity-type alloy steel.

4. The side thruster module of claim 3, wherein the cavity-type alloy steel is a titanium alloy, and the composite material is a carbon fiber.

5. The side thruster module of claim 2, wherein the propellant is a solid propellant, and wherein each of the first thrusters further comprises a liner attached to an inner wall of the combustion tube for jointing the solid propellant to the inner wall.

6. The side thruster module of claim 1, wherein the conversion nozzle is integrally formed at the body skin, and the conversion nozzle includes:
    a length portion opened in the longitudinal direction and connected to a first thruster; and a radius portion opened in the radial direction and connected to the length portion and outside.

7. The side thruster module of claim 6, wherein there is provided a plurality of said conversion nozzles, and wherein conversion nozzles which are arranged adjacent to each other in the longitudinal direction have radius portions of different lengths so that the first thrusters jointed to the conversion nozzles are stacked in the radial direction.

8. The side thruster module of claim 1, wherein the conversion nozzle is integrally formed at an inner circumference of the body skin, and further comprising a jointing portion formed between the conversion nozzle and a first thruster for jointing therebetween.

9. The side thruster module of claim 8, wherein the jointing portion includes:
    a male screw thread formed on one of an inner circumferential surface of an inlet of the conversion nozzle and an outer circumferential surface of an outlet of a first thruster; and
    a female screw thread formed on another of an inner circumferential surface of an inlet of the conversion nozzle and an outer circumferential surface of an outlet of a first thruster, and jointed to the male screw thread.

10. The side thruster module of claim 1, wherein said plurality of first thrusters and the conversion nozzles are arranged in a circumferential direction of the body skin in plural, and a weight reduction hole for reducing a weight of the body skin is formed between the adjacent conversion nozzles of the body skin.

11. The side thruster module of claim 2, further comprising a conversion nozzle closure jointed to an outlet of the conversion nozzle for sealing the conversion nozzle and a combustion tube connected to the conversion nozzle.

12. The side thruster module of claim 1, wherein each of the second thrusters comprises:
- a cavity-type combustion tube;
- a propellant arranged in the combustion tube for generating a thrust at the time of combustion;
- an igniter jointed to the combustion tube for igniting the propellant; and
- an injection nozzle jointed to an outlet of the combustion tube for outwardly injecting a thrust generated by a combustion of the propellant through the jointing groove of the body skin.

13. The side thruster module of claim 12, wherein the combustion tube is formed by filament-winding a composite material on an outer circumference of a cavity-type alloy steel.

14. The side thruster module of claim 13, wherein the cavity-type alloy steel is a titanium alloy, and the composite material is a carbon fiber.

15. The side thruster module of claim 12, wherein the propellant is a solid propellant, and each second thruster further comprises a liner attached to an inner wall of the combustion tube for jointing the solid propellant to the inner wall.

16. The side thruster module of claim 12, further comprising a jointing portion formed between an outer circumferential surface of the injection nozzle and an inner circumferential surface of the body skin that defines the jointing groove, for jointing the injection nozzle to the jointing groove.

17. The side thruster module of claim 16, wherein the jointing portion includes:
- a male screw thread formed on one of an outer circumferential surface of the injection nozzle and an inner circumferential surface of the body skin that defines the jointing groove; and
- a female screw thread formed on another of an outer circumferential surface of the injection nozzle and an inner circumferential surface of the body skin that defines the jointing groove, and jointed to the male screw thread.

18. The side thruster module of claim 12, further comprising an injection nozzle closure jointed to an outlet of the injection nozzle for sealing the combustion tube.

19. The side thruster module of claim 1, wherein said plurality of said second thrusters are arranged in a circumferential direction of the body skin in at least two rows at a spacing from each other in the longitudinal direction of the body skin, and the second thrusters of adjacent two rows are arranged in a zigzag form.

* * * * *